United States Patent
Ament et al.

(10) Patent No.: US 8,539,759 B2
(45) Date of Patent: Sep. 24, 2013

(54) REGENERATION CONTROL SYSTEM FOR A PARTICULATE FILTER

(75) Inventors: Frank Ament, Troy, MI (US); David B. Brown, Brighton, MI (US)

(73) Assignee: GM Global Technology Operations LLC

( * ) Notice: Subject to any disclaimer, the term of this patent is extended or adjusted under 35 U.S.C. 154(b) by 882 days.

(21) Appl. No.: 11/531,466

(22) Filed: Sep. 13, 2006

(65) Prior Publication Data
US 2008/0060350 A1 Mar. 13, 2008

(51) Int. Cl.
*F01N 3/00* (2006.01)
(52) U.S. Cl.
USPC ............. 60/297; 60/295; 60/286; 60/301
(58) Field of Classification Search
USPC ............ 60/274, 277, 285, 295, 297, 311, 60/276
See application file for complete search history.

(56) References Cited

U.S. PATENT DOCUMENTS

| | | | |
|---|---|---|---|
| 5,937,638 A * | 8/1999 | Akazaki et al. | 60/274 |
| 6,003,307 A * | 12/1999 | Naber et al. | 60/274 |
| 6,634,170 B2 * | 10/2003 | Hiranuma et al. | 60/295 |
| 6,763,659 B2 * | 7/2004 | Watanabe et al. | 60/297 |
| 6,851,258 B2 * | 2/2005 | Kawashima et al. | 60/311 |
| 6,969,413 B2 * | 11/2005 | Yahata et al. | 55/282.3 |
| 6,978,602 B2 * | 12/2005 | Ohtake et al. | 60/295 |
| 6,988,361 B2 * | 1/2006 | van Nieuwstadt et al. | 60/295 |
| 7,013,638 B2 * | 3/2006 | Hiranuma et al. | 60/286 |
| 7,134,275 B2 * | 11/2006 | Tsutsumoto et al. | 60/295 |
| 7,137,248 B2 * | 11/2006 | Schaller | 60/297 |
| 7,159,391 B2 * | 1/2007 | Kogo et al. | 60/297 |
| 7,169,364 B2 * | 1/2007 | Ohtake et al. | 422/168 |
| 2003/0200745 A1 * | 10/2003 | van Nieuwstadt et al. | 60/295 |
| 2004/0103654 A1 * | 6/2004 | Ohtake et al. | 60/295 |
| 2004/0187481 A1 * | 9/2004 | Elwart et al. | 60/285 |
| 2004/0200210 A1 * | 10/2004 | Lewis et al. | 60/285 |
| 2005/0060992 A1 | 3/2005 | Kogo et al. | |
| 2005/0072141 A1 * | 4/2005 | Kitahara | 60/297 |
| 2005/0086933 A1 * | 4/2005 | Nieuwstadt et al. | 60/297 |
| 2007/0186539 A1 * | 8/2007 | Dollmeyer et al. | 60/285 |

FOREIGN PATENT DOCUMENTS

| | | |
|---|---|---|
| CN | 1461379 | 12/2003 |
| CN | 1535351 | 10/2004 |
| DE | 10108720 A1 | 9/2002 |

\* cited by examiner

*Primary Examiner* — Thomas Denion
*Assistant Examiner* — Patrick Maines

(57) ABSTRACT

A regeneration control system for a particulate filter (PF) includes a condition module and an oxygen-level module. The condition module determines whether an oxygen limiting event is required for the PF during a regeneration event. The oxygen-level control module communicates with the condition module and selectively limits an oxygen level in the PF during the regeneration event.

20 Claims, 4 Drawing Sheets

REGENERATION CONTROL SYSTEM FOR A PARTICULATE FILTER

FIELD OF THE INVENTION

The present invention relates to vehicle exhaust systems, and more particularly to particulate filters in vehicle exhaust systems.

BACKGROUND OF THE INVENTION

During combustion in a diesel engine, an air/fuel mixture is compressed within a cylinder. Heat generated from compression ignites the air/fuel mixture expanding gases within the cylinder to drive a piston. Exhaust gases are released from the cylinder into an exhaust system.

A diesel particulate filter (DPF) disposed in the exhaust stream filters soot particulates in the exhaust gas. Over time the soot particulates build up inside the DPF. The DPF is periodically cleaned using a regeneration technique that burns the soot particulates.

One conventional regeneration method injects diesel fuel into the cylinder after combustion. Post-combustion injected fuel is expelled from the cylinders with the exhaust gas and is oxidized over catalysts. Heat released during oxidation increases the exhaust gas temperature, which burns trapped soot particulates in the DPF. However, in some circumstances regeneration may generate temperatures that are high enough to damage the DPF causing thermal stress and/or melting.

Various approaches have been employed to limit peak temperatures within the DPF. In one approach, post-combustion injected fuel is limited. However, this approach is ineffective because buildup of soot particulates in the DPF may be sufficient to create an exothermic reaction that increases the temperature.

In another approach, regeneration is performed more frequently to limit the buildup of soot particulates. However, if a vehicle has short driving cycles, the temperature of the exhaust gases may not be high enough to burn the soot particulates. Thus, regeneration may not occur when needed and soot particulates may build up in the DPF.

SUMMARY OF THE INVENTION

A regeneration control system for a particulate filter (PF) according to the present invention includes a condition module and an oxygen-level module. The condition module determines whether an oxygen limiting event is required for the PF during a regeneration event. The oxygen-level control module communicates with the condition module and selectively limits an oxygen level in the PF during the regeneration event.

In other features, the condition module determines whether the oxygen limiting event is required based on an oxygen level signal, a temperature signals and/or an airflow signal. The condition module determines that the oxygen limiting event is required when the oxygen level signal exceeds an oxygen level threshold. The condition module determines that the oxygen limiting event is required when the temperature signal exceeds a temperature threshold. The condition module determines that the oxygen limiting event is required when the airflow signal does not exceed an airflow threshold.

In still other features, the oxygen-level control module limits the oxygen level in the PF when the condition module determines that the oxygen limiting event is required. The oxygen-level control module limits the oxygen level in the PF with an exhaust gas recirculation valve, a variable nozzle turbine turbo, and/or a throttle.

In yet other features, the regeneration control system includes a timer that starts timing when the condition module determines that the oxygen limiting event is required and generates a disables signal after a predetermined period. The condition module determines that the oxygen limiting event is not required when said disable signal is generated. The oxygen-level control module does not limit the oxygen level in the PF when the disable signal is generated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. As used herein, the term module or device refers to an application specific integrated circuit (ASIC), an electronic circuit, a processor (shared, dedicated, or group) and memory that execute one or more software or firmware programs, and/or a combinational logic circuit.

According to the present invention, oxygen levels in exhaust gases may be limited to reduce temperatures during regeneration in a particulate filter (PF). When oxygen levels are reduced in the exhaust gases there is less soot oxidation, which limits the temperature within the PF.

Figure 1:
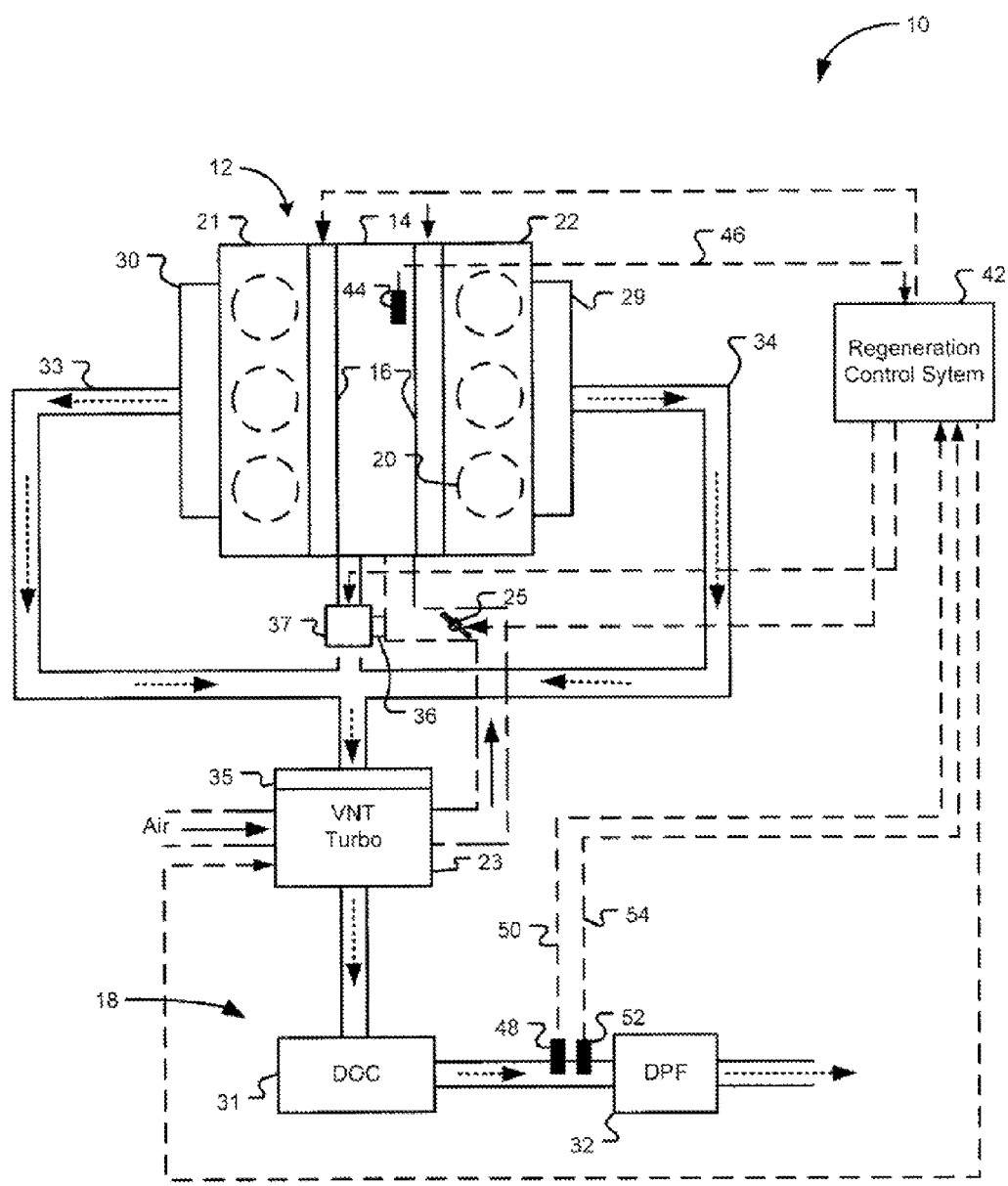
FIG. 1 is a functional block diagram of a diesel engine system using a regeneration control system according to the present invention.

Referring now to FIG. 1, an exemplary diesel engine system 10 is illustrated. It is appreciated that the diesel engine system 10 is merely exemplary in nature and that regeneration system described here in can be implemented in various engine systems implementing a particulate filter. Such engine systems may include, but are not limited to, gasoline direct injection engine systems, compressed natural gas engine systems, and homogeneous charge compression ignition engine systems. For ease of the discussion, the disclosure will be discussed in the context of a diesel engine system.

The diesel engine system 10 includes an engine 12, an intake manifold 14, a fuel injection system 16, and an exhaust system 18. The exemplary engine 12 includes six cylinders 20 configured in adjacent cylinder banks 21,22 in a V-type layout. Although FIG. 1 depicts six cylinders (N=6), it can be appreciated that the engine 12 may include additional or fewer cylinders 20. For example, engines having 2, 3, 4, 5, 6, 8, 10, 12 and 16 cylinders are contemplated. It is also appreciated that the present invention may be used in accordance with an inline-type cylinder configuration or any other type of configuration known in the art.

The diesel engine system 10 may include a variable nozzle turbine (VNT) turbo 23 that pumps additional air into the intake manifold 14 for combustion. A throttle 25 may be adjusted to control air flow through the intake manifold 14 and into the cylinders 20 from the intake manifold 14. Fuel is injected into the cylinders 20 with the fuel injection system 16. Heat generated from compressed air ignites the air/fuel mixture. The exhaust gases exit the cylinders 20 to the exhaust system 18.

The exhaust system 18 includes exhaust manifolds 29 and 30, exhaust conduits 33 and 34, a diesel oxidation catalyst (DOC) 31, and a diesel particulate filter (DPF) 32. Exhaust manifolds 29,30 direct the exhaust gases from corresponding cylinder banks 21,22 into exhaust conduits 33,34. The exhaust conduits 33,34 lead to an inlet 35 of the VNT turbo 23.

The flow of exhaust gases through the VNT turbo 23 generates power in the VNT turbo 23 sufficient to compress additional air into the intake manifold 14. The power generated may be varied by adjusting a cross sectional area of the inlet 35 controlling the rate of exhaust flow through the VNT turbo 23 and into the DOC 31. The DOC 31 oxidizes unburned hydrocarbons in the exhaust gases over a catalyst. Heat that is released during oxidation of the hydrocarbons increases the temperature of the exhaust gases. The heated exhaust gases burn soot particulates trapped in the DPF 32.

An exhaust gas recirculation system includes a recirculation conduit 36 and an exhaust gas recirculation (EGR) valve 37. The EGR valve 37 recirculates exhaust gases into the intake manifold 14. The EGR valve 37 may be modulated between open and closed positions to allow a partial flow of exhaust gases.

A regeneration control system 42 regulates operation of the diesel engine system 10. A mass air flow (MAF) sensor 44 is responsive to mass air flow and generates a MAF signal 46 based thereon. A temperature sensor 48 is responsive to the temperature of exhaust gases from the DOC 31 and generates a temperature signal 50 based thereon. An oxygen sensor 52 is responsive to a concentration of oxygen in the exhaust gases from the DOC 31 and generates an exhaust oxygen-level signal 54 based thereon. The regeneration control system 42 receives the temperature signal 50 and the exhaust oxygen-level signal 54 and generates a control signal based thereon. Alternatively, the control signal may be based on the MAF signal 46, the temperature signal 50, and the exhaust oxygen-level sensor 54.

Figure 2:
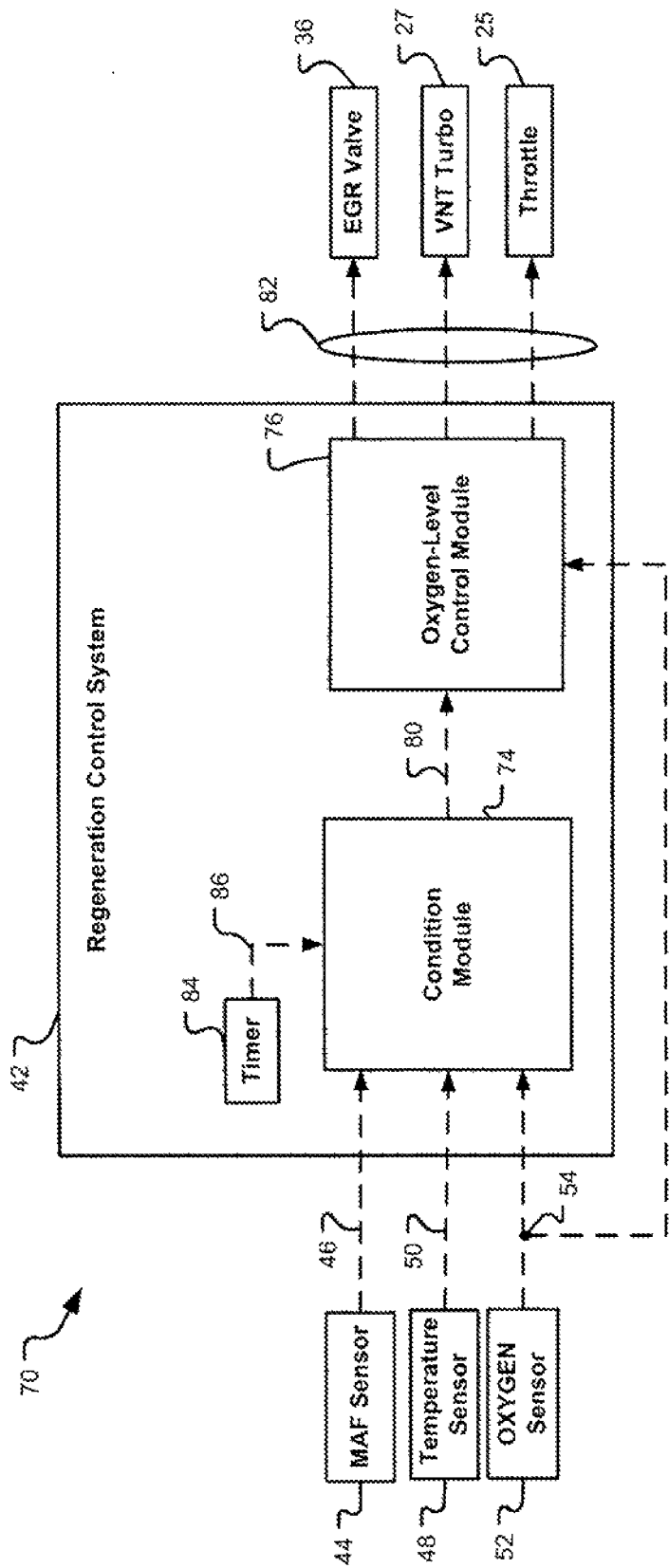
FIG. 2 is a functional block diagram of the regeneration control system according to the present invention.
Figure 3:
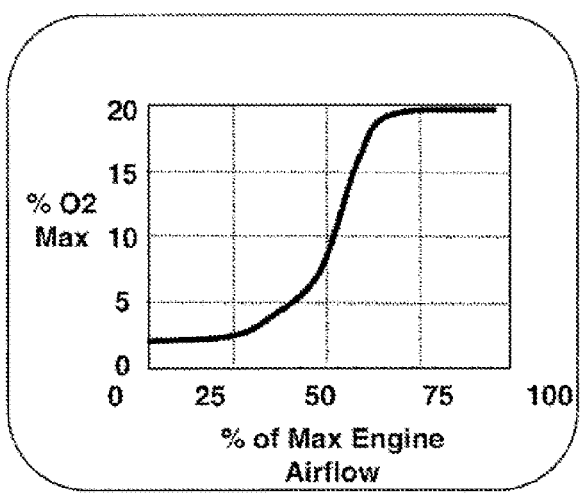
FIG. 3 is an exemplary table that may be used to determine a maximum exhaust oxygen content.

Referring now to FIG. 2, a functional block diagram 70 illustrates the regeneration control system 42 in further detail. The regeneration control system 42 may include a condition module 74 and an oxygen-level control module 76. The condition module 74 selectively generates an air flow reduction signal 80 based on the MAF signal 46, the temperature signal 50, and the exhaust oxygen-level signal 54. More specifically, the condition module 74 determines a maximum exhaust oxygen content based on a total exhaust flow rate of the exhaust system 18, whether the temperature signal 50 is greater than a temperature threshold, and whether the exhaust oxygen-level signal 54 is greater than the maximum determined oxygen-level threshold. In a preferred embodiment the maximum oxygen content is determined from the MAF, which varies from 2 to 21%, and the temperature threshold is 500° C. An exemplary table that may be used to determine the maximum exhaust oxygen content based on the total exhaust flow rate of the exhaust system 18 is depicted in FIG. 3. If the exhaust oxygen content is greater than the maximum value based on the MAF signal and the temperature signal 50 is greater than the temperature threshold, the condition module 74 generates the air flow reduction signal 80. The oxygen-level control module 76 generates a control signal 82 when the airflow reduction signal 80 is received. The control signal 82 is based on the oxygen-level signal 54 and may be used to control the EGR valve 37, the VNT turbo 23, and/or the throttle 25 and consequently control the oxygen level of the DPF 32.

The engine system 10 may not be operating in a preferred mode when the oxygen level is limited by the regeneration control system 42. Thus, the oxygen level is only limited for a predetermined period. A timer 84 is set at the beginning of a regeneration event to track an elapsed time. The timer generates a disable signal 86 that is received by the condition module 74 when the elapsed time exceeds the predetermined period. It may be appreciated by those skilled in the art that other elements capable of comprehending a particulate oxidation status may be used in place of the timer 84 to determine when to stop limiting the oxygen level. The other elements can be empirically based and/or models capable of estimating when conditions for oxygen limitation are no longer needed. When the condition module 74 receives the disable signal 86, the airflow reduction signal 80 is no longer generated and the oxygen-level control module 76 does not limit the oxygen level.

Figure 4:
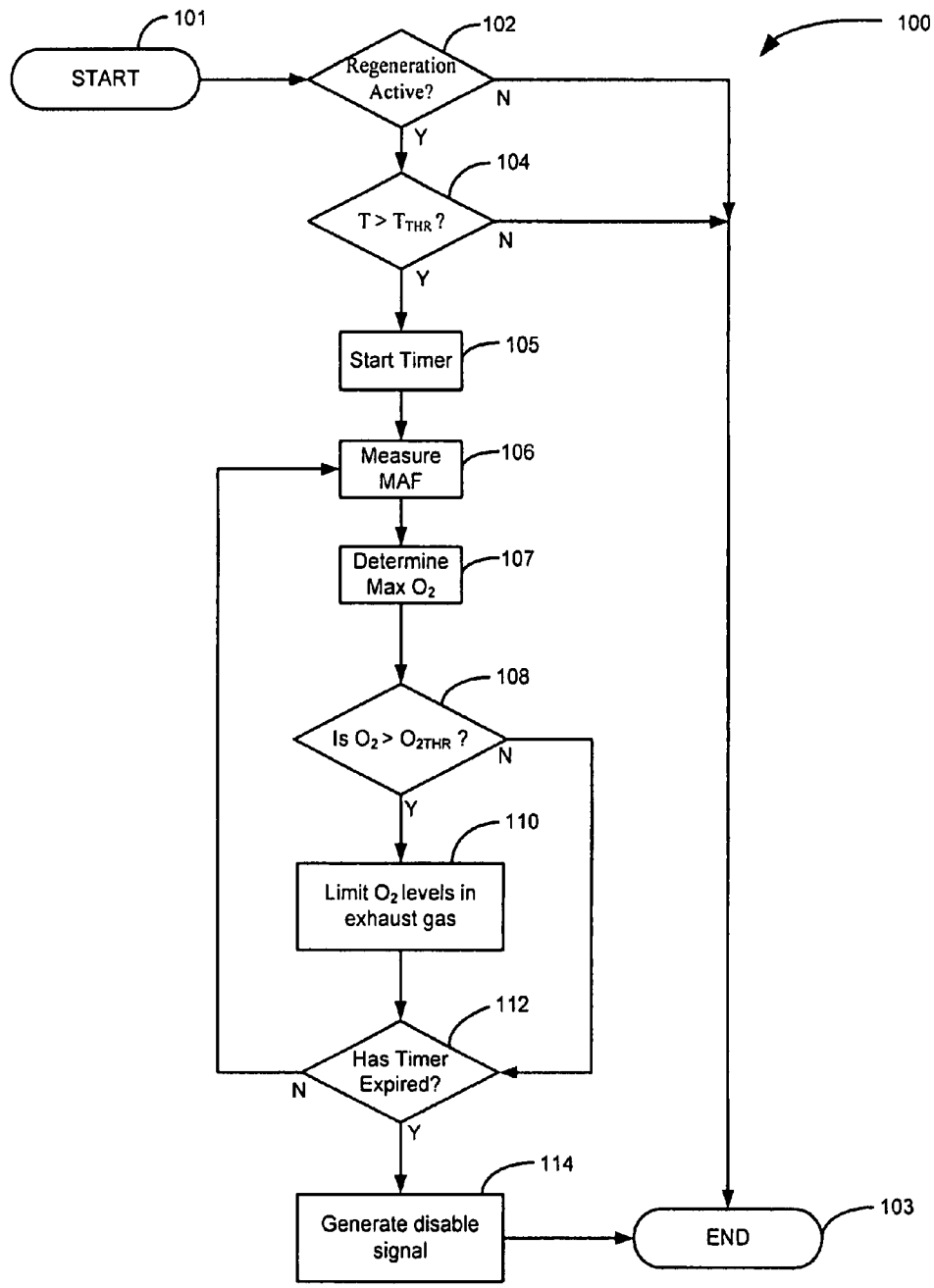
FIG. 4 is a flowchart illustrating exemplary steps taken by the regeneration control system to limit oxygen in the diesel engine system.

Referring now to FIG. 4, a flowchart illustrating exemplary steps taken by the regeneration control system 42 are generally identified at 100. Control starts in step 101 when the diesel engine system 10 is started. In step 102, control determines whether regeneration is activated. If regeneration has not been activated, control ends in step 103. If regeneration has been activated, the condition module 74 determines whether the temperature signal 50 (T) is greater than the temperature threshold ($T_{THR}$) in step 104. If the temperature signal 50 is not greater than the temperature threshold, control ends in step 103.

In step 105 control starts the timer 84. The condition module 74 measures the MAF in step 106 and then determines the maximum exhaust content based on the MAF in step 107. In step 108, control compares the oxygen-level signal 54 ($O_2$) to the oxygen threshold ($O_{2THR}$) determined in step 107 to determine whether the oxygen level in the exhaust gas is too high. If $O_2$ is greater than $O_{2THR}$ control proceeds to step 110. In step 110, the oxygen level in the exhaust gases is reduced. More specifically, the oxygen level is reduced by increasing EGR with the EGR valve 37, adjusting the inlet 35 of the VNT turbo 23, and/or adjusting the throttle 25. If $O_2$ is not greater than $O_{2THR}$ control proceeds to step 112.

In step 112 control determines whether the timer 84 has expired. If the timer 84 has expired, control generates the disable signal 86 to disable the condition module 74 in step 114 and control ends in step 103. If the timer 84 has not expired, control returns to step 106.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A regeneration control system for a particulate filter (PF) comprising:

a mass air flow (MAF) sensor that generates a MAF signal;

a condition module that determines whether an oxygen limiting event is to be performed for the PF during a regeneration event based on the MAF signal;

an oxygen-level module that communicates with the condition module and selectively limits an oxygen level in the PF during the oxygen limiting event, wherein the condition module determines a maximum oxygen content level based on the MAF signal and generates an air flow reduction signal in response to detecting the oxygen level in the PF being greater than the maximum oxygen content level; and a timer that starts timing when the oxygen-level module limits the oxygen level in the PF, wherein the condition module generates a disable signal to disable the timer and stop the limiting of the oxygen level in the PF after a predetermined period, in response to the timer expiring and while the oxygen level in the PF is greater than the maximum oxygen content level, the oxygen-level module does not limit the oxygen level in the PF, and while the oxygen level in the PF is less than or equal to the maximum oxygen content level, the oxygen-level module limits the oxygen level in the PF and the condition module determines whether the timer has expired.

2. The regeneration control system of claim 1 wherein the condition module determines whether to limit the oxygen level in the PF based on at least one of an oxygen level signal and a temperature signal.

3. The regeneration control system of claim 2 wherein the oxygen-level module limits the oxygen level in the PF during the oxygen limiting event in response to the oxygen level signal exceeding the maximum oxygen content level.

4. The regeneration control system of claim 3 wherein the oxygen-level module limits the oxygen level in the PF during the oxygen limiting event in response to the temperature signal exceeding a temperature threshold.

5. The regeneration control system of claim 4 wherein the oxygen-level module limits the oxygen level in the PF during the oxygen limiting event when the MAF signal does not exceed an airflow threshold.

6. The regeneration control system of claim 1 wherein the oxygen-level module limits the oxygen level in the PF with at least one of an exhaust gas recirculation valve, a variable nozzle turbine turbo, and a throttle.

7. The regeneration control system of claim 1 wherein the oxygen-level module refrains from limiting the oxygen level in the PF in response to the disable signal being generated.

8. The regeneration control system of claim 1 wherein the oxygen-level module generates a control signal based on the air flow reduction signal to adjust at least one of a throttle, an exhaust gas recirculation valve and a turbine turbo.

9. The regeneration control system of claim 1 wherein the condition module determines the maximum oxygen content level based on an exhaust flow rate.

10. The regeneration control system of claim 1 wherein the oxygen-level module generates a control signal based on the air flow reduction signal to adjust a throttle, an exhaust gas recirculation valve and a turbine turbo.

11. The regeneration control system of claim 1, wherein the condition module generates the air flow reduction signal to prevent the oxygen level in the PF from being greater than the maximum oxygen content level.

12. The regeneration control system of claim 1 wherein:

the condition module (i) determines a temperature of exhaust gases received by the PF, and (ii) determines whether the oxygen level in the PF is greater than the maximum oxygen content level in response to the temperature of exhaust gases received by the PF being greater than a temperature threshold;

the timer is started in response to the temperature of exhaust gases received by the PF being greater than the temperature threshold; and the oxygen-level module ceases to limit the oxygen level in the PF in response to the timer expiring.

13. A method of reducing temperature in a particulate filter (PF) comprising:

generating a mass air flow (MAF) signal;

determining whether an oxygen limiting event is to be performed for the PF during a regeneration event based on the MAF signal;

determining a maximum oxygen content level based on the MAF signal selectively limiting an oxygen level in the PF during the oxygen limiting event including generating an air flow reduction signal in response to detecting the oxygen level in the PF being greater than the maximum oxygen content level;

starting a timer when limiting the oxygen level in the PF;

generating a disable signal to disable the timer and stop the limiting of the oxygen level in the PF after a predetermined period;

in response to the timer expiring and while the oxygen level in the PF is greater than the maximum oxygen content level, not limiting the oxygen level in the PF; and while to the oxygen level in the PF is less than or equal to the maximum oxygen content level, limiting the oxygen level in the PF and determining whether the timer has expired.

14. The method of claim 13 further comprising determining whether to limit the oxygen level in the PF during the oxygen limiting event based on at least one of an oxygen level signal and a temperature signal.

15. The method of claim 14 further comprising limiting the oxygen level in the PF during the oxygen limiting event in response to the oxygen level signal exceeding the maximum oxygen content level.

16. The method of claim 15 further comprising limiting the oxygen level in the PF during the oxygen limiting event in response to the temperature signal exceeding a temperature threshold.

17. The method of claim 16 further comprising limiting the oxygen level in the PF during the oxygen limiting event when the MAF signal does not exceed an airflow threshold.

18. The method of claim 13 further comprising limiting the oxygen level in the PF with at least one of an exhaust gas recirculation valve, a variable nozzle turbine turbo, and a throttle.

19. The method of claim 13 further comprising refraining from limiting the oxygen level in the PF when the disable signal is generated.

20. The method of claim 13 further comprising:

determining a temperature of exhaust gases received by the PF determining whether the oxygen level in the PF is greater than the maximum oxygen content level in response to the temperature of exhaust gases received by the PF being greater than a temperature threshold;

starting the timer in response to the temperature of exhaust gases received by the PF being greater than the temperature threshold; and ceasing to limit the oxygen level in the PF in response to the timer expiring.

* * * * *